A. OSTHEIMER.
FASTENING CONTRIVANCE.
APPLICATION FILED MAY 14, 1913.
1,094,091.
Patented Apr. 21, 1914.
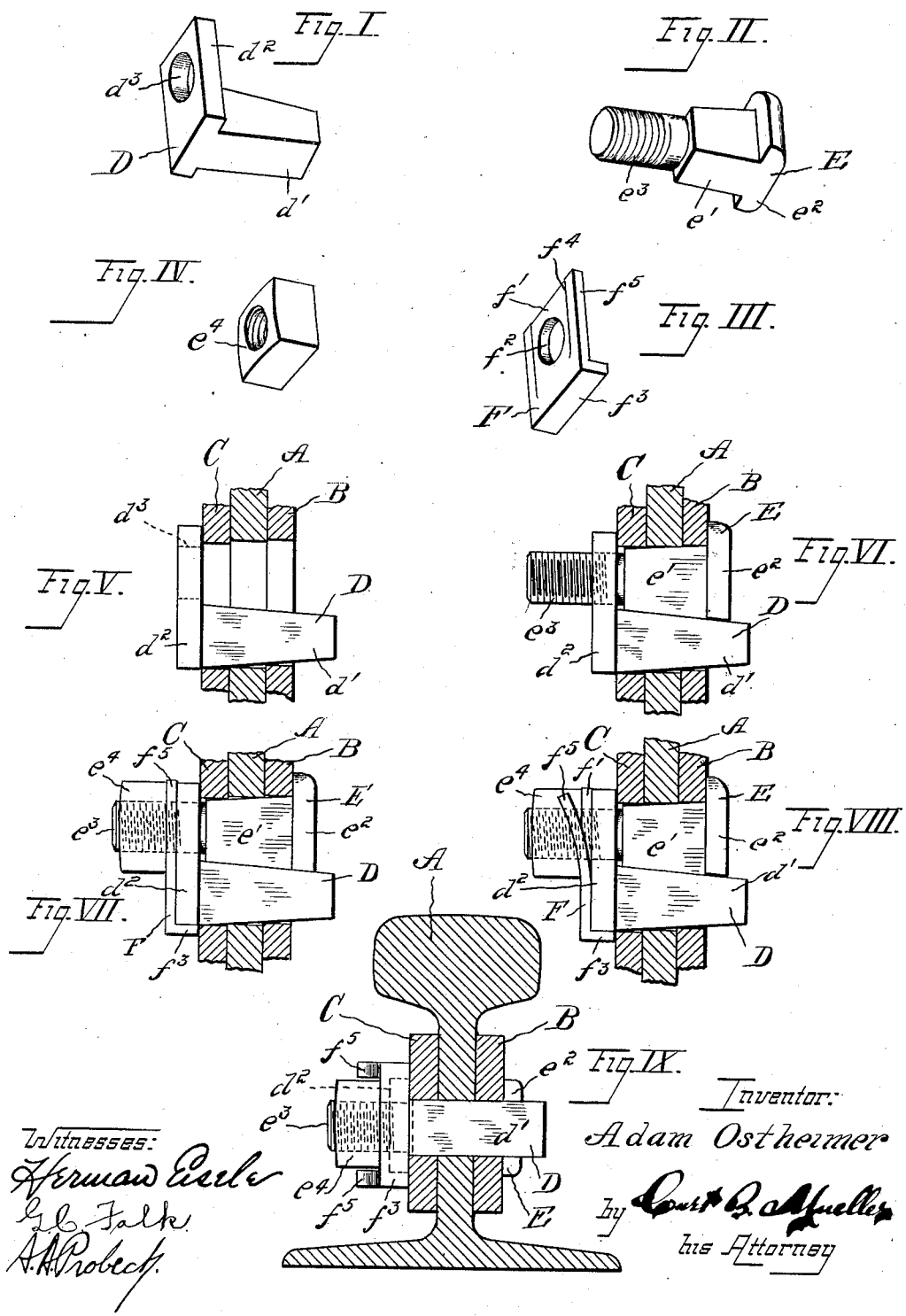

UNITED STATES PATENT OFFICE.

ADAM OSTHEIMER, OF CLEVELAND, OHIO.

FASTENING CONTRIVANCE.

1,094,091.  Specification of Letters Patent.  Patented Apr. 21, 1914.

Application filed May 14, 1913. Serial No. 767,566.

*To all whom it may concern:*

Be it known that I, ADAM OSTHEIMER, a citizen of the United States, residing at Cleveland, in the county of Cuyahoga and State of Ohio, have invented a new and useful Improvement in Fastening Contrivances, of which the following is a specification, the principle of the invention being herein explained and the best mode in which I have contemplated applying that principle, so as to distinguish it from other inventions.

My invention relates generally to a fastening contrivance adapted to secure two members with relation to each other by passing it through registering openings formed therein. The conception is more particularly adapted for fixing relative to each other two members which are subjected to such strains or jolts as would be likely to tend to loosen whatever fastening means had been employed to hold them together.

My inventive contrivance incidentally involves a nut-lock feature.

The object of my invention is to provide a construction of the character just indicated which will prove more efficient than others till now known to the market and the while be sufficiently simple and economical of manufacture.

The inventive conception is embodied in means which are hereinafter explained and variously combined in the claims, while the annexed drawing and particular description thereof together set forth in detail one certain means constituting my invention, the disclosed means however, being but one of various mechanical forms in which the principle of my invention may be applied.

Figure I is a perspective view of one part of my invention. Fig. II is a perspective view of another part. Fig. III is a perspective view of a third part. Fig. IV is a perspective view of still another part. Fig. V is a side view showing one part inserted in the registering openings of a plurality of members which it is intended to secure with respect to each other. Fig. VI is a view similar to Fig. V with a second part likewise inserted through such registering openings. Fig. VII is a view similar to both Figs. V and VI showing the conjunctive application of the two other parts of my invention. Fig. VIII is the same as Fig. VII showing the locking means in operative position. Fig. IX is a section of a railroad rail with two oppositely disposed fish-plates showing the application thereto of my fastening contrivance in elevation.

I have designated a railroad rail as A and two fish-plates adjacent its opposite sides as B and C respectively. These three members will be presumed to have been provided with registering openings, in this instance, of angular configuration.

A wedge member D is fashioned at one end with a wedge portion proper $d'$, and at the other larger end with a laterally projecting flange $d^2$ having an opening $d^3$ intended to also register with the openings in the members which are to be secured together. The wedge member D is first inserted through the plurality of registering openings as separately shown in Fig. V.

A complementary member E which is intended to be inserted through the registering openings in an opposed direction as separately represented in Fig. VI. It also comprises a portion $e'$ of wedge formation. Adjacent the larger end of this wedge portion $e'$ is a laterally projecting flange $e^2$, and the direction of projection of this flange should correspond with that of the flange $d^2$. The other extremity of the member E is of circular cross-section and provided with screw-threads $e^3$ whereby the member E may fulfil at one and the same time the functions of a secondary wedge and of a bolt as will hereinafter more clearly appear. The threaded end of the member E projects through the opening $d^3$ in the flange $d^2$ and extends a sufficient distance outwardly beyond the same.

A lock washer F of angular cross-section is provided and comprises a flat major portion $f'$ having an opening $f^2$ also positioned so as to be capable of registration with the opening $d^3$, and a depending flange portion $f^3$ adapted to lie adjacent an outer side of the member D, and specifically that side opposite to the one over which the flange $d^2$ extends. This washer F lies adjacent the flange $d^2$ as clearly appearing in Figs. VII and VIII. Two opposite portions of the washer F, and in the exemplification shown those edges which are normally substantially parallel with the direction of projection of the flange $d^2$, are slitted at $f^4$ along a given distance of their extent and but a slight distance from the edges proper. It is these sections $f^5$ thus formed in the washer which are capable of constituting the locking means in a manner, while well known to the art, to be nevertheless yet explained. An ordinary nut $e^4$, provided with female screw-threads complementary to the male threads on the member E, may be turned upon the latter to approach and press against the washer F whereby the wedge portions $d'$ and $e'$ are slid along each other to become firmly wedged in the registering openings of the rail and plates. After the nut $e^4$ has been tightly screwed against the washer F, the two sections $f^5$ may be bent upwardly as indicated in Figs. VIII and IX to preclude the further rotation of the nut in either direction.

Attention is directed to the fact that my fastening contrivance occasions a binding effect in both transverse directions whereby a more permanently rigid and fixed relationship between all the parts is assured.

My invention being thus described with sufficient thoroughness, what I desire to secure by Letters Patent and therefore claim specifically, is:

1. A fastening contrivance comprising the combination of a member having two parts angularly disposed with respect to each other, one of said parts being provided with an opening, a second member projecting through said opening, and means for fixing said members with respect to each other.

2. A fastening contrivance comprising the combination of two members having registering openings, a wedge projecting through said openings and provided with a laterally projecting flange, said flange having an opening registering with said first mentioned openings, a bolt projecting through all of said openings and a nut for fixing said wedge and bolt relative to each other.

3. A fastening contrivance comprising the combination of two members having registering openings, a wedge projecting in a given direction therethrough and provided with an overlying flange itself provided with an opening in registration with said first mentioned openings, a counter wedge projecting in the reverse direction through said set of openings and means for drawing said wedges together.

Signed by me, this 10th day of May, 1913.

ADAM OSTHEIMER.

Attested by—
J. A. Fogle,
Helen Hine.

---

Copies of this patent may be obtained for five cents each, by addressing the "Commissioner of Patents, Washington, D. C."